US011980578B2

(12) United States Patent
Hansen

(10) Patent No.: US 11,980,578 B2
(45) Date of Patent: May 14, 2024

(54) TOILET CHAIR AND A METHOD FOR AIDING A PERSON IN GETTING UNDRESSED OR DRESSED BY MEANS OF A TOILET CHAIR

(71) Applicant: DAN-REHAB A/S, Tørring (DK)

(72) Inventor: Jacob Falck Hansen, Skanderborg (DK)

(73) Assignee: DAN-REHAB A/S, Tørring (DK)

( * ) Notice: Subject to any disclaimer, the term of this patent is extended or adjusted under 35 U.S.C. 154(b) by 909 days.

(21) Appl. No.: 16/961,132

(22) PCT Filed: Jan. 15, 2019

(86) PCT No.: PCT/DK2019/050013
§ 371 (c)(1),
(2) Date: Jul. 9, 2020

(87) PCT Pub. No.: WO2019/141325
PCT Pub. Date: Jul. 25, 2019

(65) Prior Publication Data

US 2020/0337920 A1 Oct. 29, 2020

(30) Foreign Application Priority Data

Jan. 17, 2018 (DK) ........................... PA 2018 70029
May 15, 2018 (DK) ........................... PA 2018 70297

(51) Int. Cl.
*A61G 5/10* (2006.01)
*A47K 11/04* (2006.01)
(Continued)

(52) U.S. Cl.
CPC ............ *A61G 5/1002* (2013.01); *A47K 11/04* (2013.01); *A61G 5/006* (2013.01); *A61G 5/1067* (2013.01); *A61G 5/12* (2013.01)

(58) Field of Classification Search
CPC .. A61G 5/1002; A61G 5/1067; A61G 5/1064; A61G 5/14; A47K 11/04; A47K 13/10; A47K 2017/006; B60N 2/2222
See application file for complete search history.

(56) References Cited

U.S. PATENT DOCUMENTS 4,574,901 A * 3/1986 Joyner ................. A61G 5/1091 180/907
4,587,678 A * 5/1986 Love .................... A61G 7/1094 297/DIG. 10
(Continued)

FOREIGN PATENT DOCUMENTS

EP 1772132 A1 4/2007
FR 3032156 A1 * 8/2016 ........... B60N 2/2209
(Continued)

OTHER PUBLICATIONS

Danish Search Report dated Jun. 13, 2018 for Danish Patent Application No. PA 2018 70029, 1 page.
(Continued)

*Primary Examiner* — Timothy J Brindley
(74) *Attorney, Agent, or Firm* — Lee & Hayes, P.C.; Mike Merkelbach

(57) ABSTRACT

Disclosed is a toilet chair (1) comprising a chair back (2) including a head part (3) and a bottom part (4) and a seat (5) comprising a front part (6) and a rear part (8), wherein the seat (5) further comprises a toilet opening (7) through which a user may go to the toilet. The bottom part (4) and the rear part (8) are arranged next to each other and the bottom part (4) is arranged to be displaceable outwards in a direction towards the front of the chair (1) and the rear part (8) is arranged to be displaceable upwards in a direction towards the front of the chair (1). Methods for aiding a person in
(Continued)

Figure 2:
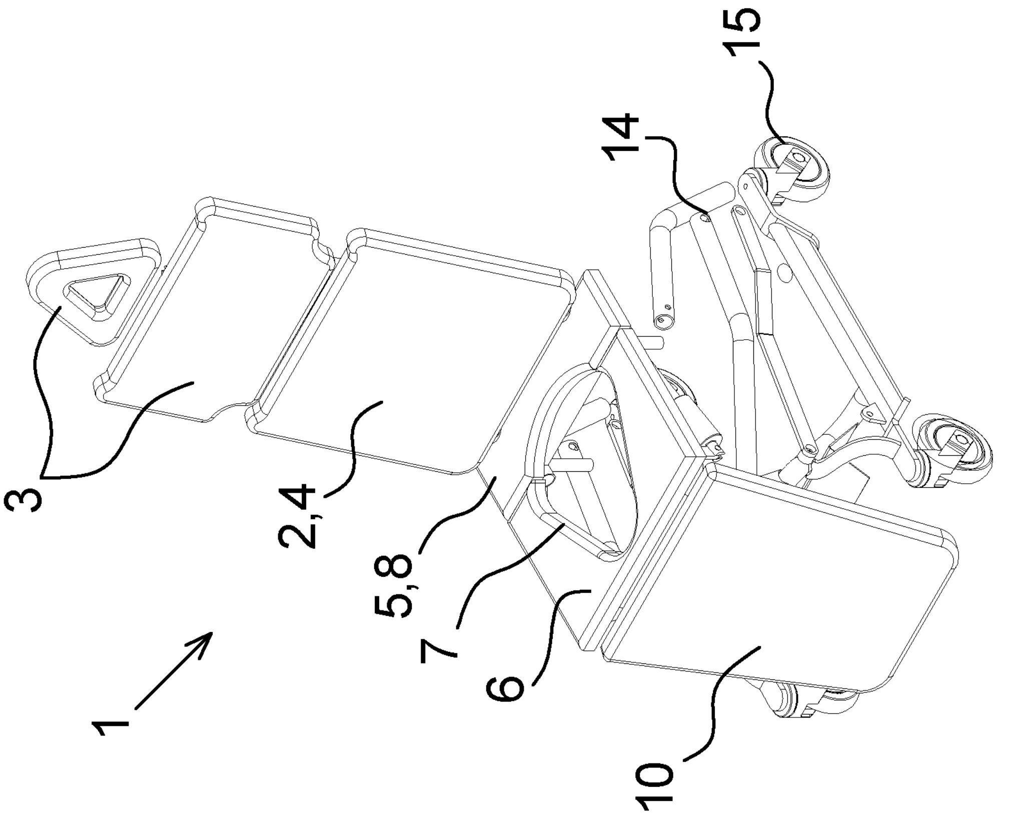

getting undressed or dressed by means of a toilet chair (1) and use of a toilet chair (1) is also disclosed.

23 Claims, 8 Drawing Sheets

(51) Int. Cl.
*A61G 5/00* (2006.01)
*A61G 5/12* (2006.01)

(56) References Cited

U.S. PATENT DOCUMENTS

| | | | | | |
|---|---|---|---|---|---|
| 4,856,123 | A * | 8/1989 | Henderson | A61G 5/1002 | 5/604 |
| 5,063,617 | A * | 11/1991 | Ward | A61G 7/1007 | 297/DIG. 10 |
| 5,316,370 | A * | 5/1994 | Newman | A61G 5/14 | 297/DIG. 10 |
| 5,380,034 | A * | 1/1995 | Wilson | A61G 7/053 | 297/29 |
| 5,737,786 | A * | 4/1998 | Yamamoto | A61G 7/02 | 5/81.1 R |
| 6,154,896 | A * | 12/2000 | Houston | A61G 7/1094 | 297/DIG. 10 |
| 6,449,783 | B1 * | 9/2002 | Moser | A61G 7/1094 | 4/667 |
| 6,598,246 | B1 * | 7/2003 | Shou | A61G 7/1094 | 297/DIG. 10 |
| 6,945,604 | B2 * | 9/2005 | Splane, Jr. | A61G 7/1007 | 297/DIG. 10 |
| 8,876,149 | B2 * | 11/2014 | Wilson | A61G 5/122 | 280/657 |
| 2006/0048296 | A1 * | 3/2006 | Sutou | A61G 7/1046 | 4/667 |
| 2007/0057554 | A1 * | 3/2007 | Lipford | A61G 5/14 | 297/325 |
| 2011/0121626 | A1 * | 5/2011 | Lipford | A61G 5/14 | 297/330 |
| 2013/0009435 | A1 * | 1/2013 | Westerink | B60N 2/1839 | 297/313 |
| 2013/0020779 | A1 * | 1/2013 | Green | A61G 5/1067 | 280/200 |
| 2014/0130244 | A1 | 5/2014 | Schottenstein et al. | | |
| 2018/0092465 | A1 * | 4/2018 | Seibold | B60N 2/2352 | |
| 2019/0290519 | A1 * | 9/2019 | Sjogren | A61G 7/1007 | |

FOREIGN PATENT DOCUMENTS

| | | | | | |
|---|---|---|---|---|---|
| JP | 06072214 | A | * | 3/1994 | |
| JP | 06072215 | A | * | 3/1994 | |
| JP | 06078840 | A | * | 3/1994 | |
| JP | H0659129 | U | * | 8/1994 | |
| JP | 07257250 | A | * | 10/1995 | A47C 7/405 |
| KR | 101629101 | B1 | * | 6/2016 | |
| KR | 20190046362 | A | * | 5/2019 | |
| NL | 1024032 | C2 | * | 2/2005 | A61G 5/1002 |
| NL | 1024032 | C2 | | 2/2005 | |
| WO | WO9960977 | A1 | | 12/1999 | |
| WO | WO2004098480 | A1 | | 11/2004 | |
| WO | WO-2019180570 | A1 | * | 9/2019 | |

OTHER PUBLICATIONS

International Search Report and Written Opinion dated Apr. 2, 2019 for International Patent Application No. PCT/DK2019/050013, 9 pages.

* cited by examiner

TOILET CHAIR AND A METHOD FOR AIDING A PERSON IN GETTING UNDRESSED OR DRESSED BY MEANS OF A TOILET CHAIR

CROSS REFERENCE TO RELATED APPLICATIONS

This application is a U.S. National Phase Application of International Application No. PCT/DK2019/050013, filed Jan. 15, 2019, which claims priority to Danish Patent Application No. PA 2018 70297, filed May 15, 2018, and Danish Patent Application No. PA 2018 70029, filed Jan. 17, 2018, which are incorporated herein by reference in their entirety.

BACKGROUND OF THE INVENTION

The invention relates to a toilet chair comprising a chair back including a head part and a bottom part and a seat comprising a front part and a rear part, wherein the seat further comprises a toilet opening through which a user may go to the toilet.

The invention further relates to a method for aiding a person in getting undressed or dressed by means of a toilet chair and use of a toilet chair.

DESCRIPTION OF THE RELATED ART

Particularly in relation to elder care, care of people with physical or mental handicaps or disabilities, persons may have such reduced mobility that they are not able to go to the toilet or take a shower by themselves.

From the international patent application WO 99/60977 it is therefore known to place the person in a chair provided with a hole in the seat, so that the person may go to the toilet through this hole. However, in relation to persons that are more or less paralysed or are more or less self-immobile it is also a difficult task to remove the persons trousers and/or undergarment both in relation to the toilet function and in relation to bathing the person or simply dressing and undressing the person. From WO 99/60977 it is therefore known to form the chair with adjustable back and leg rest so that the persons seat and thigh area are lifted of the chair so that the persons trousers and/or undergarment may be pulled down. However, this chair requires substantial mobility of the user or substantial lifting of an assisting nurse or other.

An object of the invention is therefore to provide for advantageous technique for use in relation with dressing and undressing a weak or handicapped person.

The Invention

The invention provides for a toilet chair comprising a chair back including a head part and a bottom part. The toilet chair also comprises a seat including a front part and a rear part, wherein the seat further comprises a toilet opening through which a user may go to the toilet. The bottom part and the rear part are arranged next to each other and the bottom part is arranged to be displaceable outwards in a direction towards the front of the chair and the rear part is arranged to be displaceable upwards in a direction towards the front of the chair.

Providing the chair with a toilet opening is advantageous in that the person hereby can go to the toilet while sitting in the chair either through the toilet opening and into an incorporated toilet or by placing the toilet opening over an existing toilet or into a bedpan or similar being placed into or under the toilet opening.

And forming a displaceable rear part of the seat and bottom part of the back of the chair is advantageous in that the lumbar area, and the buttocks and thigh area of a person can be selectively displaced upwards/outwards to enable that these areas may be lifted from the chair so that an assisting nurse or other may pull the persons trousers and/or undergarment down substantially without having to lift the person.

It should be emphasised that by the term “toilet chair” is to be understood any kind of chair in which a user may sit—i.e. a chair capable of having a back in more or less vertical position while a seat of the chair is raised off the ground and is in more or less horizontal position. In some embodiments, the chair may also comprise a leg rest. In some embodiments the angle of the back, the leg rest, and even the seat may be adjustable.

It should also be noticed that the terms “the bottom part is arranged to be displaceable outwards” and “the rear part is arranged to be displaceable upwards” does not in any way exclude that the bottom part and/or rear part are also arranged to be displaceable inwards/downwards, or e.g. that the bottom part is displaced outwards while the rear part is displaced downwards and/or vice versa.

In an embodiment of the invention, the chair comprises back angle adjustment means for adjusting the back angle of the back in relation to the seat.

It is advantageous to provide the chair with back angle adjustment means in that the back of the chair hereby selectively can be leaned back during use to ease the dressing and undressing process.

It should be emphasised that by the term “back angle adjustment means” is to be understood any kind of back angle adjuster such as any kind of guide, joint, actuator or other or any combination thereof enabling that the angle of the back of a chair may be adjusted in relation to the seat of the chair.

In an embodiment of the invention, the chair (1) comprises a leg rest (10) and wherein the chair (1) comprises leg rest angle adjustment means (11) for adjusting the leg rest angle (LA) of the leg rest (10) in relation to the seat (5).

It is advantageous to provide the chair with a leg rest, in that a leg rest increases the comfort for the person using the chair particularly during the dressing and undressing process and it is advantageous to provide the chair with leg rest angle adjustment means in that the angle of the leg rest of the chair hereby selectively can be adjusted during use e.g. in relation to the angle of the back to ease the dressing and undressing process.

It should be emphasised that by the term “leg rest angle adjustment means” is to be understood any kind of leg rest angle adjuster such as any kind of guide, joint, actuator or other or any combination thereof enabling that the angle of the leg rest of a chair may be adjusted in relation to the seat of the chair.

In an embodiment of the invention, the chair (1) comprises an angle link (22) arranged to link the back angle (BA) to the leg rest angle (LA).

Connecting the back of the chair with the leg rest through an angle link is advantageous in that the back angle and the leg rest angle hereby can be adjusted simultaneously by the same actuator and/or through the same actuation process.

In an embodiment of the invention, the chair (1) comprises back mechanical actuation means (16) for displacing the bottom part (4) and seat mechanical actuation means (17) for displacing the rear part (8).

Providing the chair with back mechanical actuation means and seat mechanical actuation means is advantageous in the such mechanical actuation means will make the displacing process more effortless and precise.

It should be emphasised that by the term "back mechanical actuation means" is to be understood any kind of back mechanical actuator such as any kind of pneumatic cylinder, electrical actuator, spindle and nut system or other or any combination thereof enabling that the bottom part of a chair back may be displaced in relation to the head part of the chair back and it should be emphasised that by the term "seat mechanical actuation means" is to be understood any kind of seat mechanical actuator such as any kind of pneumatic cylinder, electrical actuator, spindle and nut system or other or any combination thereof enabling that the rear part of a chair seat may be displaced in relation to the front part of the chair seat.

In an embodiment of the invention, the back mechanical actuation means (16) and the seat mechanical actuation means (17) are linked by means of a displacement link (24).

Connecting the back mechanical actuation means and the seat mechanical actuation means through a displacement link is advantageous in that the bottom part and the rear part hereby can be adjusted simultaneously by the same actuator and/or through the same actuation process. E.g. by advantageously linking the back mechanical actuation means and the seat mechanical actuation means so that they always move the bottom part and the rear part in opposite directions—in relation to the front side of the chair.

In an embodiment of the invention, the bottom part (4) is arranged to be displaceable outwards by being arranged to tilt around a back pivot point (23).

Arranging the bottom part to be displaceable by tilting around a back pivot point is advantageous in that it is relatively simple and inexpensive to displace through tilting.

In an embodiment of the invention, the rear part (8) is arranged to be displaceable upwards by being arranged to tilt around a seat pivot point (20).

Arranging the rear part to be displaceable by tilting around a seat pivot point is advantageous in that it is relatively simple and inexpensive to displace through tilting.

In an embodiment of the invention, the head part (3) and the bottom part (4) are formed as two separate individual parts.

Forming the head part and the bottom part as two separate individual parts is advantageous in that it hereby is possible to displace the bottom part without displacing the head part which is more comfortable to the user.

In an embodiment of the invention, the bottom part (4) is arranged to be displaceable outwards by means of a back tilt joint (12) arrange at the transition between the head part (3) and the bottom part (4) enabling the bottom part (4) to tilt around the back tilt joint (12).

Forming the bottom part tilting around the back tilt joint is advantageous in that this will enable a smoother transition from the head part and the bottom part and thereby increase the comfort for the user.

In an embodiment of the invention, the front part (6) and the rear part (8) are formed as two separate individual parts.

Forming the front part and the rear part as two separate individual parts is advantageous in that it hereby is possible to displace the rear part without displacing the front part which can be more comfortable to the user.

In an embodiment of the invention, the rear part (8) is arranged to be displaceable upwards by means of a seat tilt joint (21) arrange at the transition between the front part (6) and the rear part (8) enabling the rear part (8) to tilt around the seat tilt joint (21).

Forming the rear part tilting around the seat tilt joint is advantageous in that this will enable a smoother transition from the front part and the rear part and thereby increase the comfort for the user.

In an embodiment of the invention, the rear part (8) is arranged to be displaceable upwards by means of linear guiding means (13) arranged for guiding the rear part (8) linearly upwards.

It is advantageous that the rear part is arranged to be linearly displaced in that this provides a more efficient lift and in that the lifting means can be formed directly under the seat to ensure a more compact chair.

It should be emphasised that by the term "linear guiding means" is to be understood any kind of linear guide such as any kind of guide, track, piston or other or any combination thereof enabling that the rear part of the seat of a chair may be displaced linearly upwards.

In an embodiment of the invention, the bottom part (4) is arranged to be displaceable outwards independently of the head part (3).

Forming the chair so that the bottom part of the back of the chair can be displaced independently of the head part is advantageous in that it increases user comfort and enables different functionality of the bottom part and the head part.

In an embodiment of the invention, the rear part (8) is arranged to be displaceable upwards independently of the front part (6).

Forming the chair so that the rear part of the seat of the chair can be displaced independently of the front part is advantageous in that it increases user comfort and enables different functionality of the front part and the rear part.

In an embodiment of the invention, the toilet opening (7) extends across the front part (6) and the rear part (8).

Forming the toilet opening so large that it extends across the front part and the rear part of the seat is advantageous in that less precision in positioning the person in the chair in thereby required and in that the risk of soiling the chair during use as a toilet chair is thereby reduced.

The invention further provides for a method for aiding a person in getting undressed by means of a toilet chair (1) according to any of the preceding claims, wherein the method comprises the steps of:

placing the person in the toilet chair (1),
displacing the rear part (8) upwards,
pulling the trousers and/or undergarment of the person down towards the rear part (8),
displacing the bottom part (4) outward,
retracting the rear part (8),
pulling the trousers and/or undergarment of the person down towards the front part (6),
e.g. displacing the rear part (8) upwards again to pull the trousers and/or undergarment of the person further down towards the front part (6) after which the rear part (8) is retracted again, and
retracting the bottom part (4).

It is advantageous to raise and lower the rear part and the bottom part in the described way in that this enables that the trousers and/or undergarment of a more or less immobile person can be pulled all the way from the waist and down to the knee area by only a single helper.

It should be emphasised that in this context the term "trousers and/or undergarment" should to be understood in the broadest sense—i.e. as just about any kind of clothing a person could wear from the waist down—such as any kind of pants, shorts, skirts, tights and/or other.

In an embodiment of the invention, is tilted backwards before the rear part (8) is displaced upwards.

It is advantageous to displace the rear part upwards once the back is tilted backwards to ensure that the upper backside of a user is more efficient lifted of—or at least almost of—the bottom of the chair back.

In an embodiment of the invention, the leg rest (10) is tilted upwards before the rear part (8) is displaced upwards.

It is advantageous to tilt the leg rest upwards before the rear part is displaced upwards to ensure that the backside of a user can be more efficient lifted of—or at least almost of—the bottom of the chair back and the rear of the seat and to increase user comfort.

In an embodiment of the invention, the rear part (8) is displaced upwards while the bottom part (4) is retracting and vice versa.

Linking motion of the bottom part of the back of the chair and the rear part of the seat so that the rear part is displaced upwards while the bottom part is retracting is advantageous in that the rear part and the bottom part hereby can be adjusted simultaneously by the same actuator and/or through the same actuation process.

Even further, the invention provides for a method for aiding a person in getting dressed by means of a toilet chair (1) according to any of claims 1-16, wherein the method comprises the steps of:

- placing the person in the toilet chair (1),
- displacing the rear part (8) upwards,
- pulling the trousers and/or undergarment of the person up towards the rear part (8),
- displacing the bottom part (4) outward,
- retracting the rear part (8),
- pulling the trousers and/or undergarment of the person up towards the front part (6),
- displacing the rear part (8) upwards again
- retracting the bottom part (4) to pull the trousers and/or undergarment of the person further up towards the head part (3), and
- retracting the rear part (8) after which the person may be removed from the toilet chair (1).

It is advantageous to raise and lower the rear part and the bottom part in the described way in that this enables that the trousers and/or undergarment of a more or less immobile person can be pulled all the way from the knee area and up to the waist by only a single helper.

In an embodiment of the invention, the back (2) is tilted backwards before the rear part (8) is displaced upwards.

It is advantageous to displace the rear part upwards once the back is tilted backwards to ensure that the upper backside of a user is more efficient lifted of—or at least almost of—the bottom of the chair back.

In an embodiment of the invention, the leg rest (10) is tilted upwards before the rear part (8) is displaced upwards.

It is advantageous to tilt the leg rest upwards before the rear part is displaced upwards to ensure that the backside of a user can be more efficient lifted of—or at least almost of—the bottom of the chair back and the rear of the seat and to increase user comfort.

In an embodiment of the invention, the rear part (8) is displaced upwards while the bottom part (4) is retracting and vice versa.

Linking motion of the bottom part of the back of the chair and the rear part of the seat so that the rear part is displaced upwards while the bottom part is retracting is advantageous in that the rear part and the bottom part hereby can be adjusted simultaneously by the same actuator and/or through the same actuation process.

Also, the invention provides for use of a toilet chair according to any of the previously discussed toilet chairs for aiding in undressing a person before going to the toilet in the toilet chair.

Using the toilet chair according to the present invention is advantageous in that in relation to toilet visits of more or less immobile persons the toilet visit can be made by the help of only a single helper.

FIGURES

Figure 1:
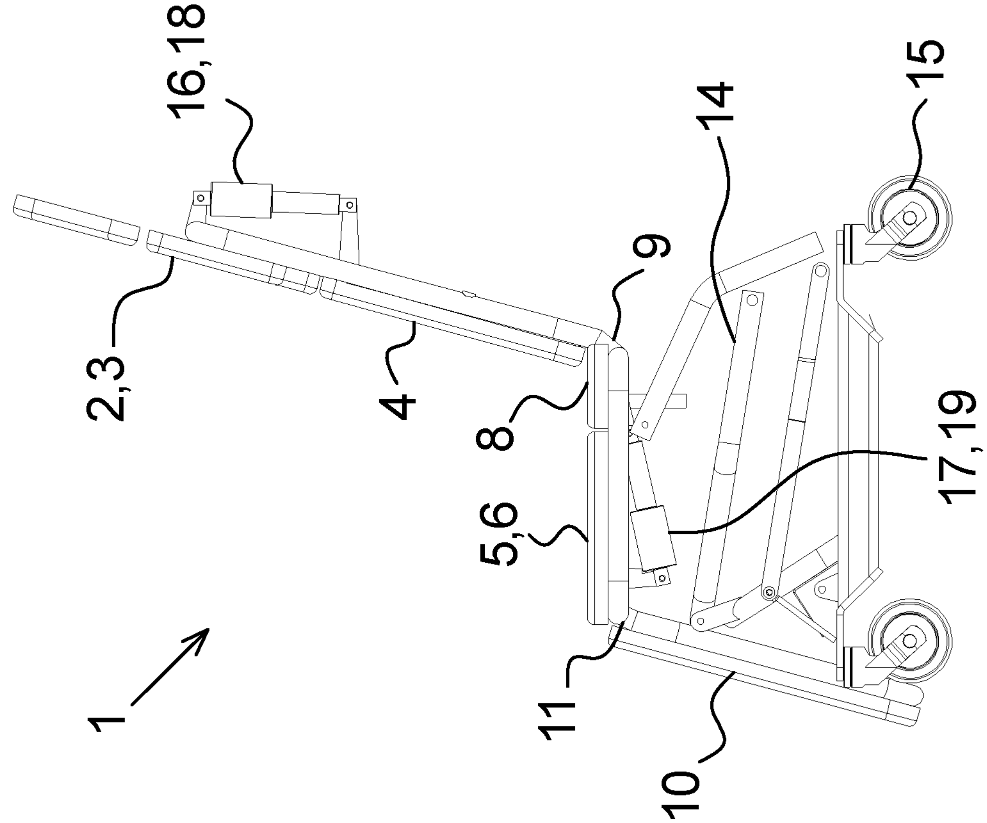
Figure 3:
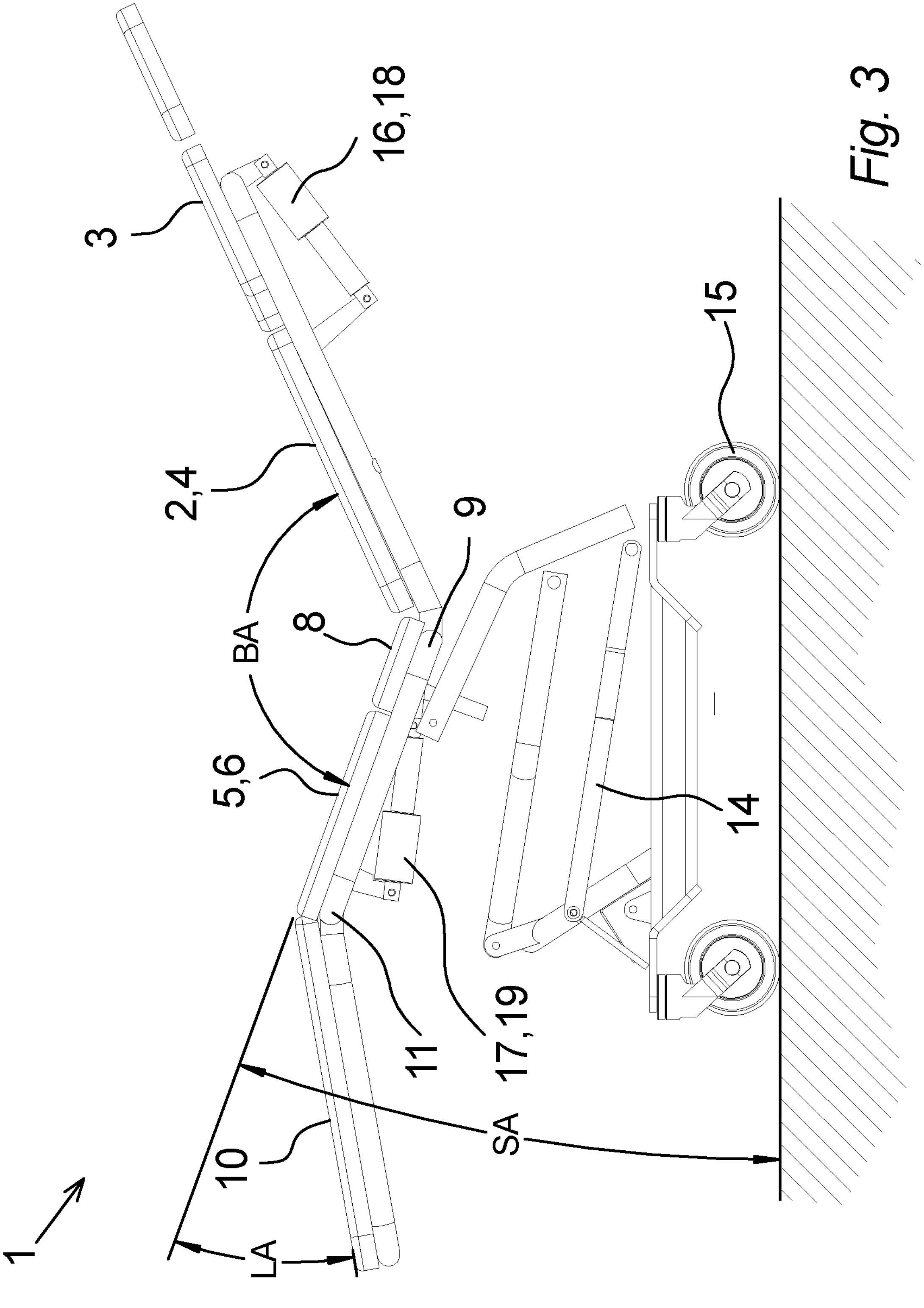
Figure 4:
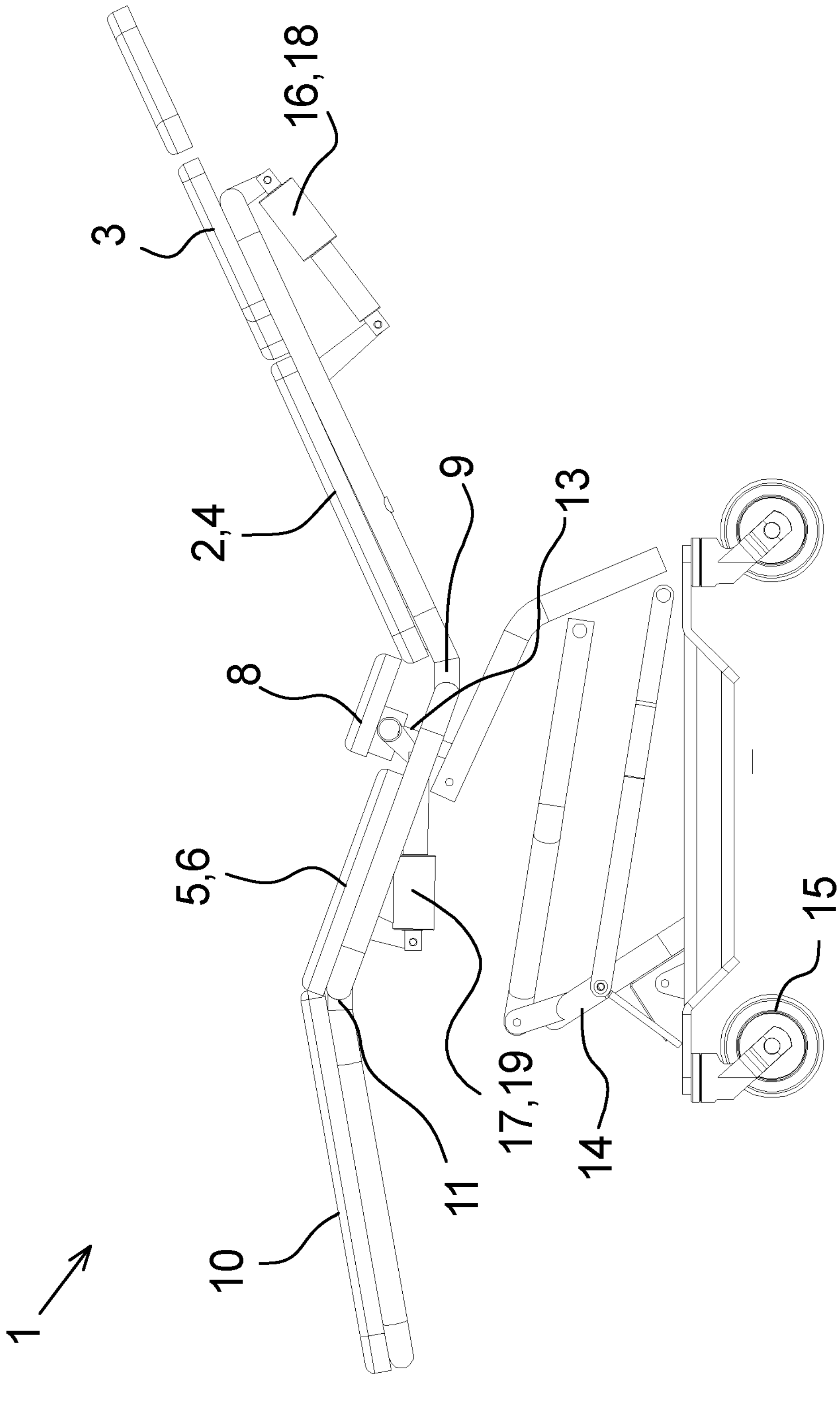
Figure 5:
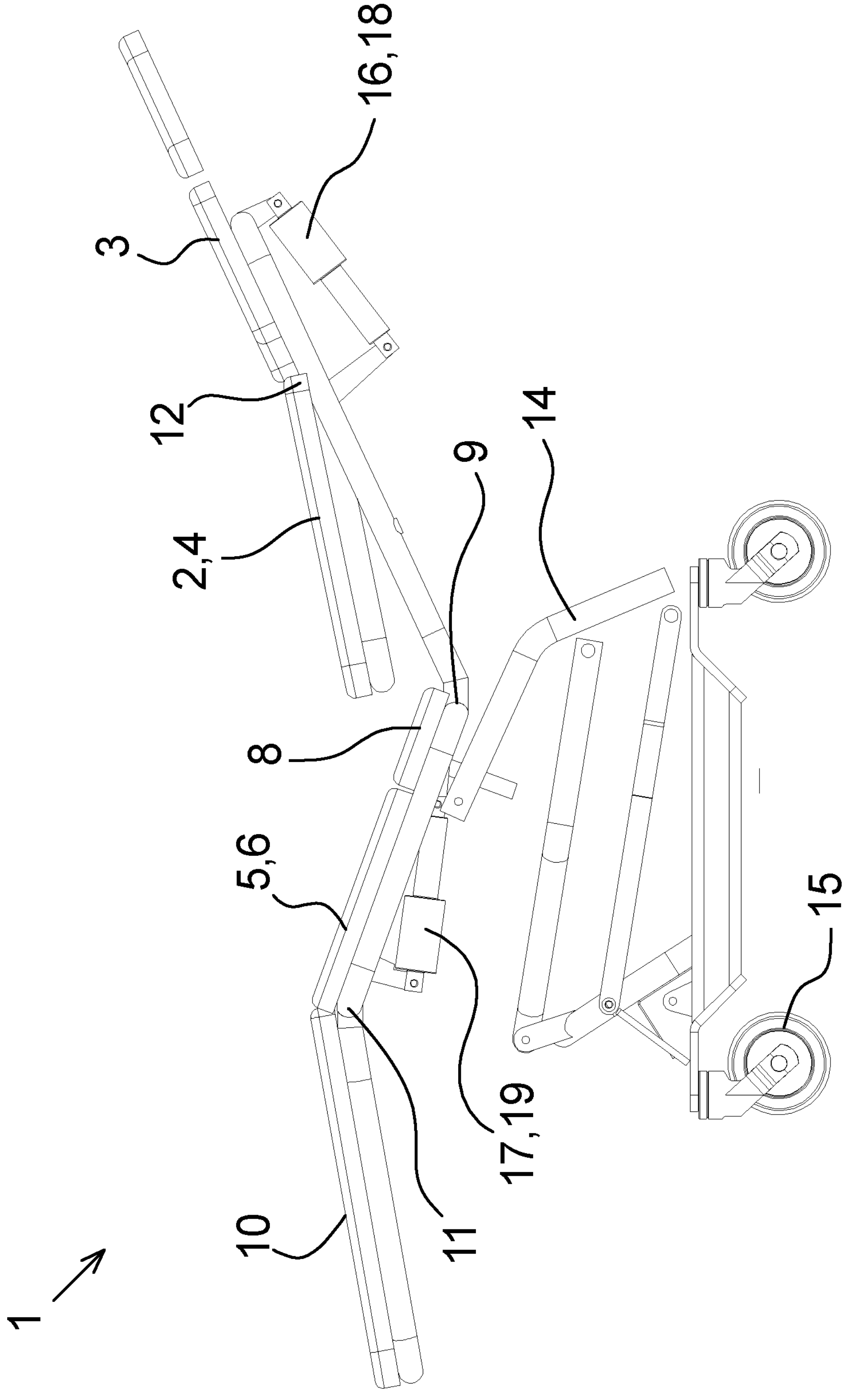
Figure 7:
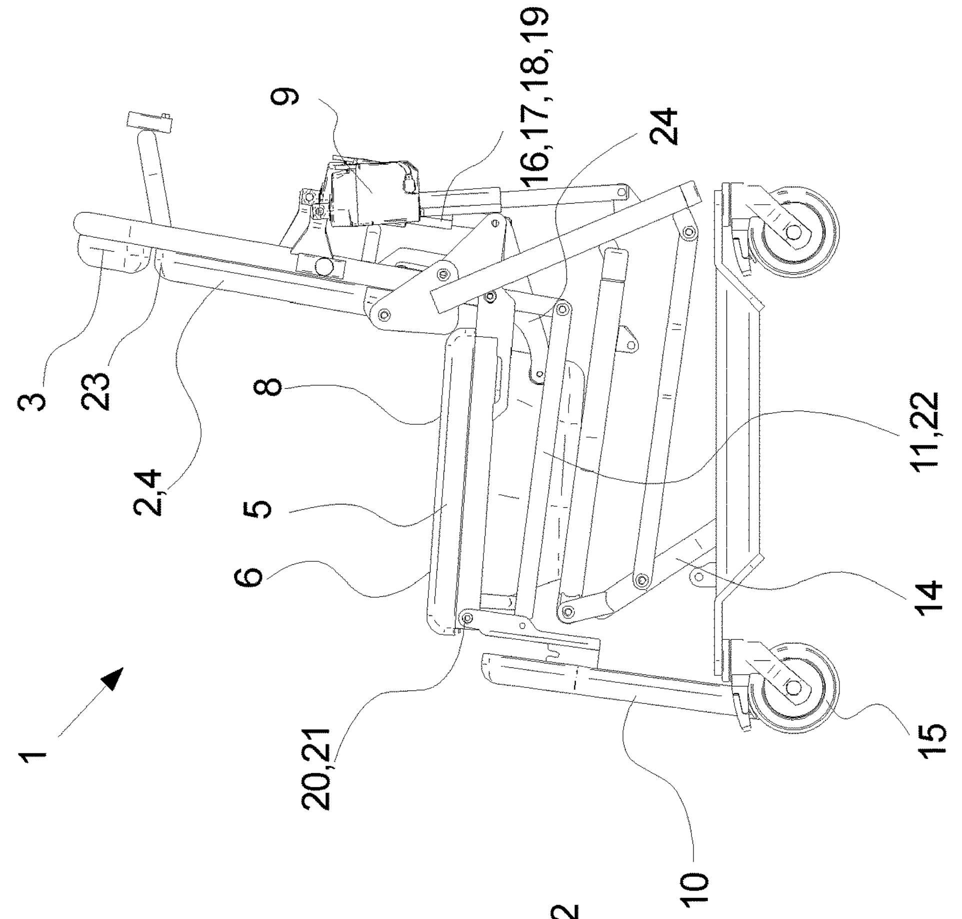
Figure 6:
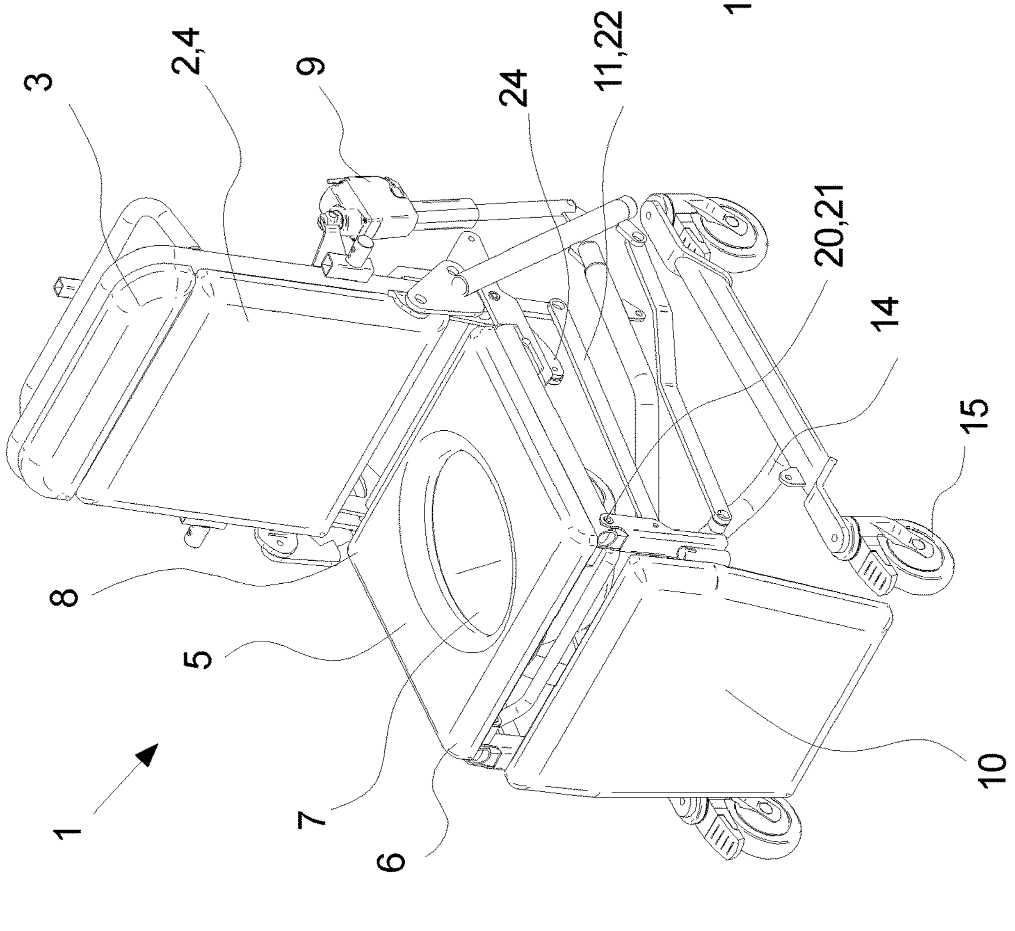
Figures 8, 9:
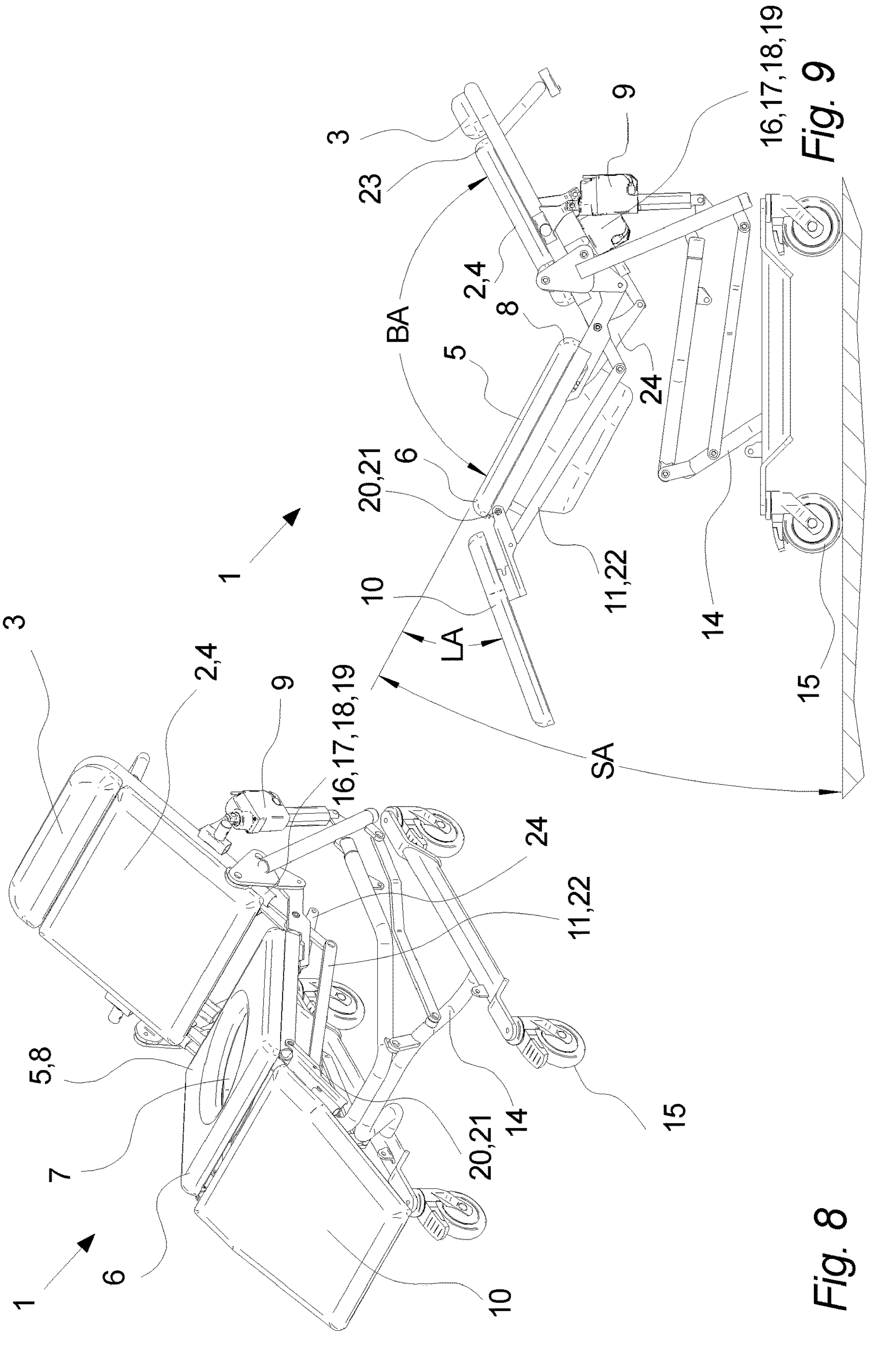
Figure 11:
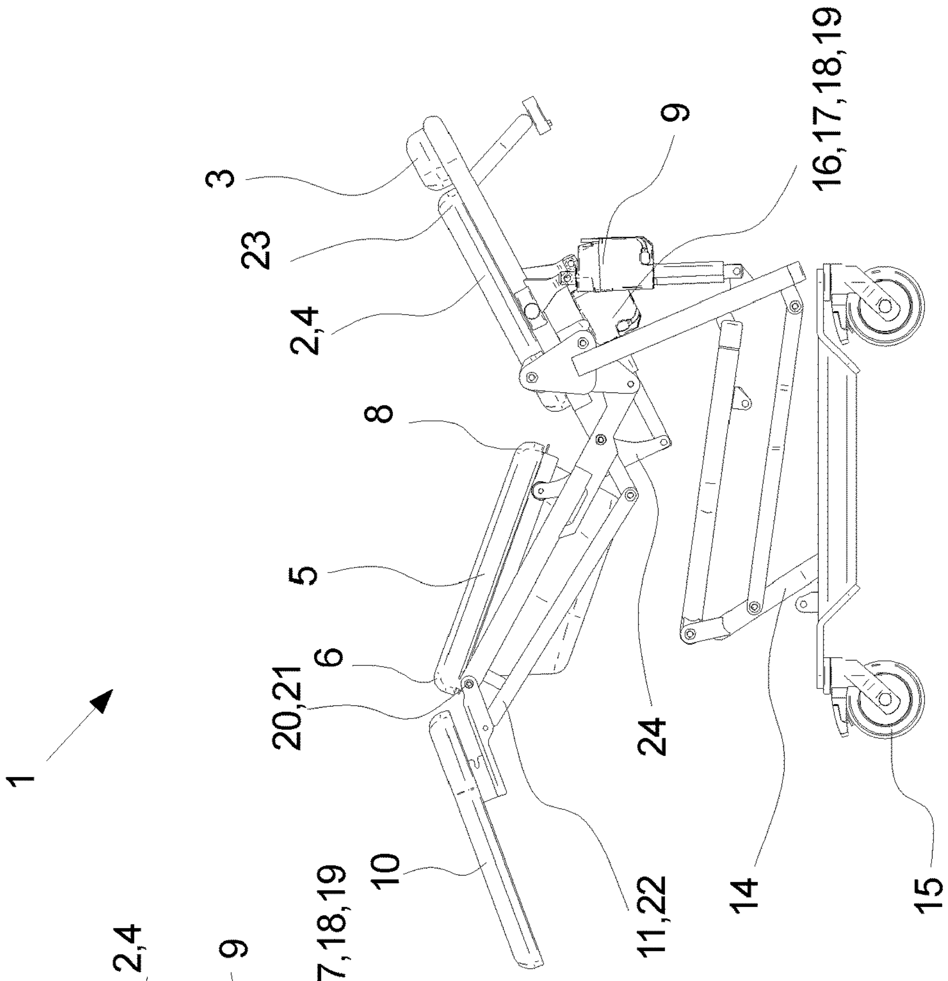
Figure 10:
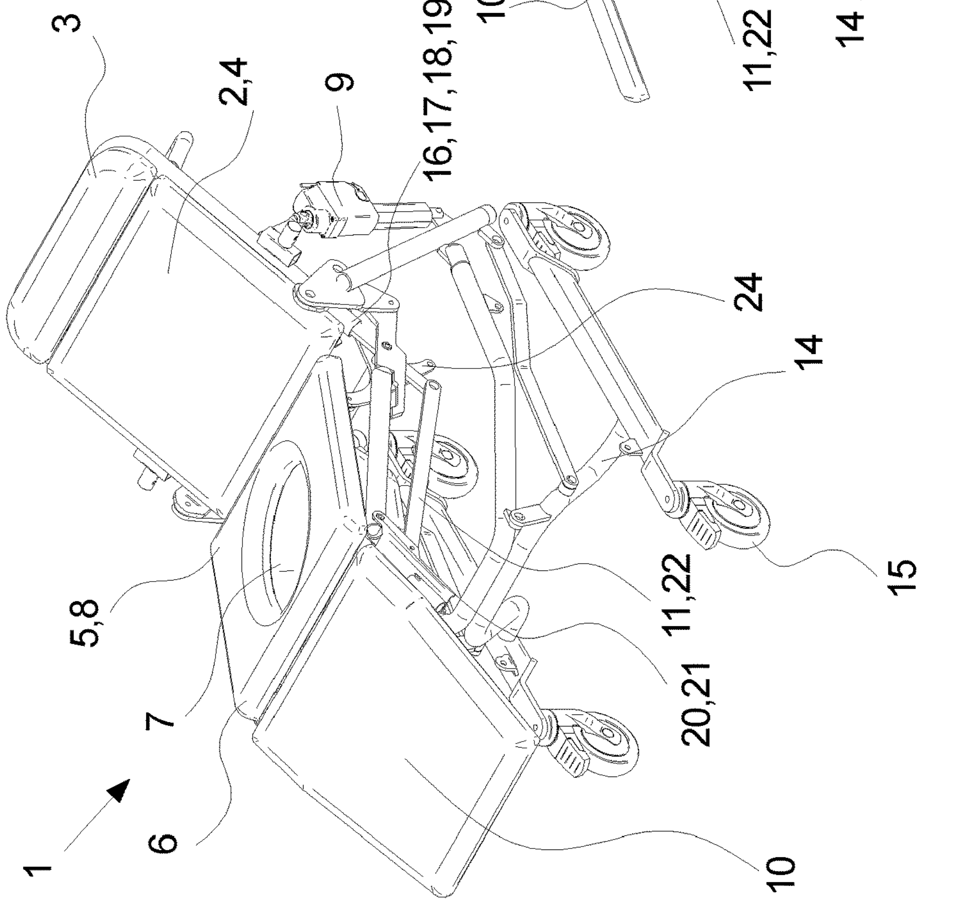
Figure 13:
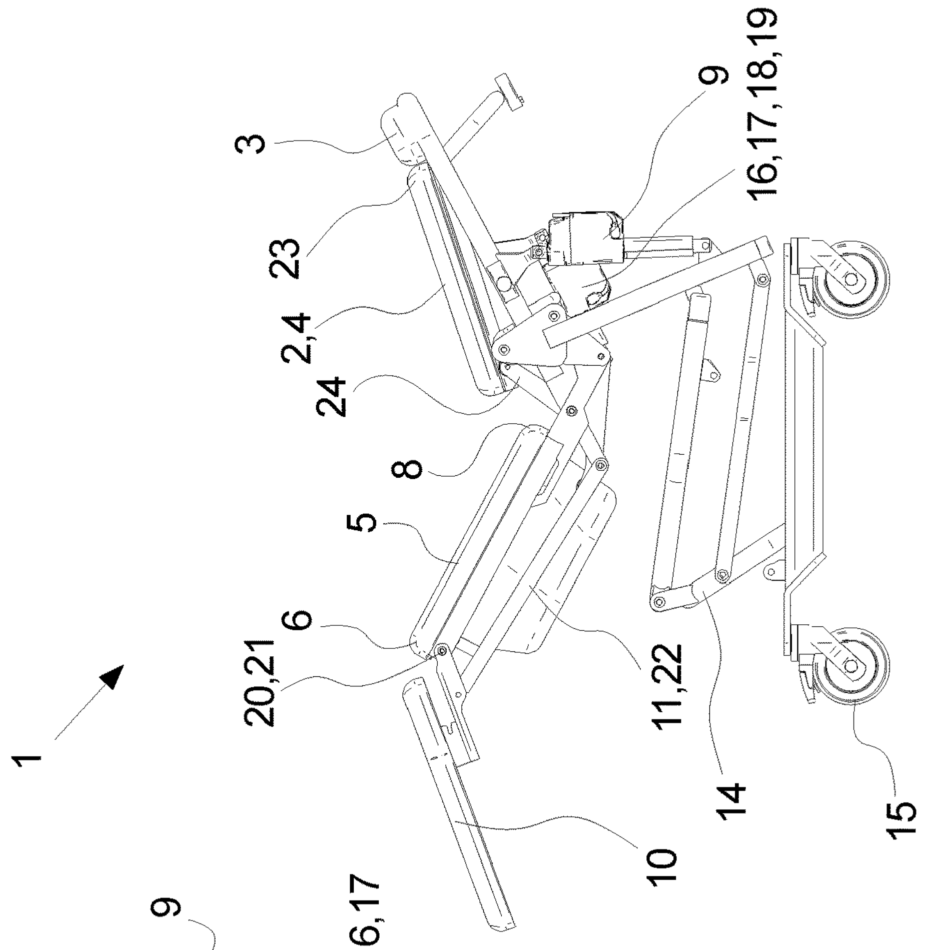
Figure 12:
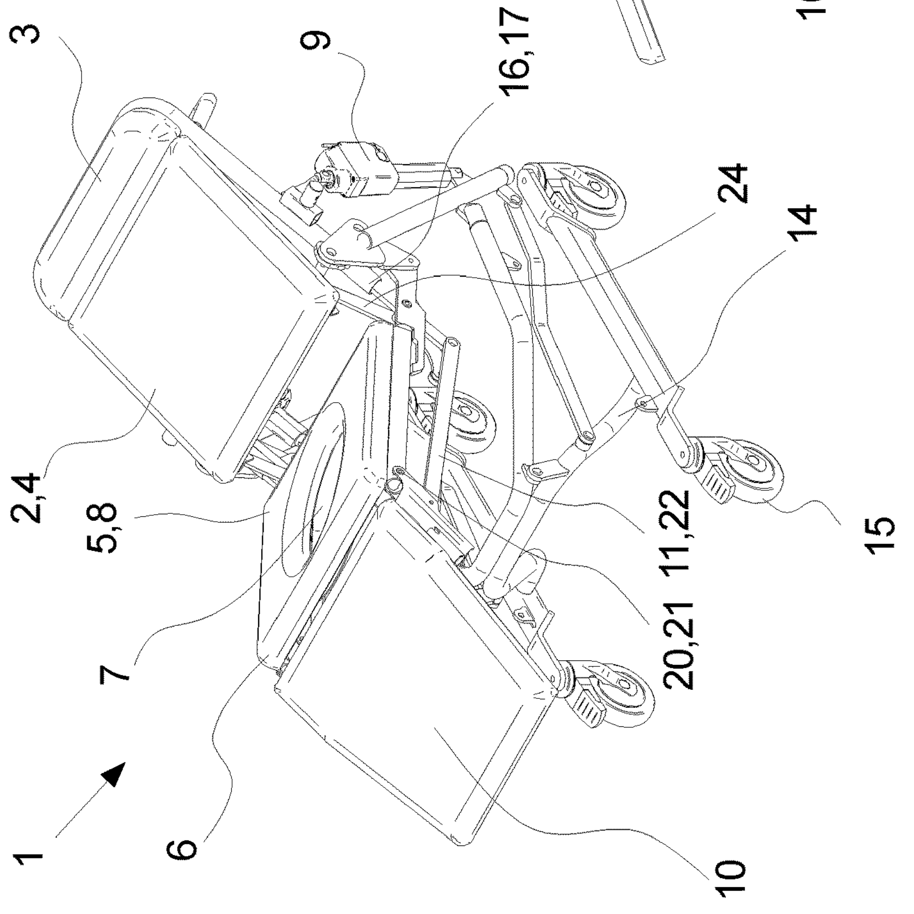

The invention will be described in the following with reference to the figures in which FIG. 1 illustrates a toilet chair in raised position, as seen from the FIG. 2 illustrates a toilet chair in raised position, as seen in perspective, FIG. 3 illustrates a toilet chair in lowered position, as seen from the side, FIG. 4 illustrates a toilet chair with a rear part raised, as seen from the side, FIG. 5 illustrates a toilet chair with a bottom part raised, as seen from the side, FIG. 6 illustrates a toilet chair in raised position as seen in perspective, FIG. 7 illustrates a toilet chair in raised position as seen from the side, FIG. 8 illustrates a toilet chair in lowered position as seen in perspective, FIG. 9 illustrates a toilet chair in lowered position as seen from the side, FIG. 10 illustrates a toilet chair with a tilted seat as seen in perspective, FIG. 11 illustrates a toilet chair with a tilted seat as seen from the side, FIG. 12 illustrates a toilet chair with a raised bottom part seen in perspective, and FIG. 13 illustrates a toilet chair with a raised bottom part as seen from the side.

DETAILED DESCRIPTION OF THE INVENTION

FIG. 1 illustrates a toilet chair 1 in raised position, as seen from the side, and FIG. 2 illustrates a toilet chair 1 in raised position, as seen in perspective.

In this embodiment, the toilet chair 1 comprises an underframe 14 provided with height adjustment means arranged to enable that the height of the chair 1 may be adjusted—i.e. the seats 5 distance from the floor may be adjusted through a multi-joint mechanism and an electrical powered actuator (not shown). However, in another embodiment the chair 1 could be arranged to be height adjusted in other ways, such as by means of spring, air cylinders or other, the height adjustment could be manual or the chair 1 could be arranged with the seat 5 in a fixed height.

In this embodiment, the chair 1 is also provided with wheels 15 enabling that the chair 1 may be pushed around, e.g. to move the user into a bathroom or the like. However, in another embodiment at least some of the wheels 15 could be driven so that the chair 1 would be self-propelled and so that the user may use the chair as a transport vehicle.

In another embodiment, the chair 1 could be formed without wheels 15 so that the position of the chair 1 would be more or less fixed.

In this embodiment, the toilet chair 1 comprises a chair back 2, which in this embodiment is formed by a head part 3 and a bottom part 4. In this embodiment, the head part 3 is formed by two individual parts but in another embodiment the head part 3 could be formed as one single part or as three or more individual parts all arranged at the head area of a chair back 2.

In another embodiment, the back 2 could comprise more parts than just the head part 3 and the bottom part 4.

In this embodiment, the bottom part 4 is formed as a single part but in another embodiment the bottom part 4 could be formed by two or more individual parts all arranged at the lower back area of a chair back 2.

In this embodiment, the chair 1 is also provided with a seat 5 which in this case comprises a front part 6—arranged at the thigh area of a chair user—and a rear part 8—arranged at the buttocks area of a chair user.

In this embodiment both the front part 6 and the and the rear part 5 are each formed as a single part but in another embodiment the front part 6 and/or the rear part 5 could be formed by two or more individual parts.

In this embodiment, the seat 5 is provided with a toilet opening 7 enabling free access through the seat 5, so that a user of the chair 1 may go to the toilet into a bedpan, a toilet, a potty or similar located under or in the toilet opening 7 while sitting in the chair 1.

In this embodiment, the toilet opening 7 extends across both the front part 6 and the and the rear part 5 but in another embodiment the toilet opening 7 could be formed in only the front part 6 or only in the rear part 5.

Since the bottom part 4 is defined as being the lower part of the back 2 and since the rear part 8 is defined at being the part of the seat 5 being furthest to the rear (i.e. nearest to the chair back 2) the bottom part 4 and the rear part 8 are therefore arranged next to each other in this embodiment, with nothing but a crack between the two parts 5, 6. However, in another a narrow part—such as a fillet, a bridging part, a moulding, a bar or other—may be arranged between the two parts 5, 6 e.g. to increase comfort, to reduce crush hazard or other.

In this embodiment the chair back 2, the seat 5, the leg rest 10 and substantially all other parts of the chair are formed from a non-hygroscopic material such as a plastic material—e.g. polyurethane foam, nylon, melamine or other —, a metal such as aluminum, stainless steel, coated steel or other, natural or artificial rubber materials or another material that is substantially structurally stable and does substantially not absorb water or disintegrate when being subject to water. Also in this embodiment actuators, joints, wirings and other are formed substantially waterproof so that the entire chair 1 may be washed without particular considerations and so that a person can be bathed while sitting in the chair 1.

In this embodiment, the chair 1 is shown without armrests but in a preferred embodiment both sides would be provided with an armrest both to increase comfort for the user—in that the user will be able to rest arms on the armrests—but also to increase the safety of the chair 1 in that the armrests will reduce the risk of a weak or immobile person falling out of the chair 1. In a preferred embodiment, the position and/or angle of the armrests will follow or at least somehow be linked to the angle and/or position of the chair back 2.

FIG. 3 illustrates a toilet chair 1 in lowered position, as seen from the side.

In this embodiment, the toilet chair 1 comprises back angle adjustment means 9 for adjusting the back angle BA of the back 2 in relation to the seat 5 so that the back 2 may be adjusted from a more or less upright position as disclosed in FIG. 1 to a leaned back position as disclosed in FIG. 3.

In this embodiment, the back angle adjustment means 9 enables that the back angle BA between the back 2 and the seat 5 may be adjusted between 100 and 140 degrees but in another embodiment the back angle BA could be adjustable between 80 and 180 degrees or between 90 and 160 degrees or any combination thereof.

Also in this embodiment, the toilet chair 1 comprises leg rest angle adjustment means 11 for adjusting the leg rest angle LA of the leg rest 10 in relation to the seat 5 so that the leg rest 10 may be adjusted from a more vertical position as disclosed in FIG. 1 to the raised position disclosed in FIG. 3.

In this embodiment, the leg rest angle adjustment means 11 enables that the leg rest angle LA between the leg rest 10 and the seat 5 may be adjusted between 80 and 30 degrees but in another embodiment the leg rest angle LA could be adjustable between 120 and 0 degrees or between 90 and 15 degrees or any combination thereof.

In this embodiment, the toilet chair 1 is also provided with seat angle adjustment means (not shown) for adjusting the seat angle SA of the seat 5 in relation to the underlying ground so that the seat 5 may be adjusted from a more or less horizontal position disclosed in FIG. 1 to the slightly tilted position disclosed in FIG. 3.

In this embodiment the back angle BA, leg rest angle LA and the seat angle SA can be individually adjusted but in another embodiment two or more of these could be mechanically coupled, so that if e.g. the back 2 is moved backwards the leg rest 10 is automatically simultaneously raised.

In this embodiment, the back angle adjustment means 9 and the leg rest angle adjustment means 11 are enabled through joints by which the leg rest 10 and the back 2 may tilt in relation to the seat 5 and in this embodiment the back angle BA, leg rest angle LA and the seat angle SA can be individually adjusted by means of individual actuators (not shown) but in another embodiment the back angle BA, leg rest angle LA and/or the seat angle SA could be coupled and adjusted by means of the same actuator and/one or more could also or instead be manually operated.

FIG. 4 illustrates a toilet chair 1 with a rear part 8 raised, as seen from the side.

In this embodiment, the rear part 8 is arranged to be displaceable upwards in a direction towards the front of the chair 1 independently of the front part 6 so that the upper part of the buttocks—the part neighbouring the lumbar area—of a person occupying the chair 1 is directly lifted. Furthermore, in this way the lumbar area of this person is also lifted and a helper may pull the trousers and/or undergarment of this dressed person down towards the rear part 8. After this the bottom part 4 is raised and the rear part 8 is lowered as disclosed in FIG. 5 so that the buttocks area of the person is lifted free of at least most of the seat 5 so that the trousers and/or undergarment may be pulled further down towards the knees of the person. After the trousers and/or undergarment are pulled past the rear part 8, the rear part 8 could be raised again to enable that the trousers and/or undergarment may be pulled further down. With trousers and/or undergarment in this pulled down position the person may go to the toilet through the toilet opening 7 or the helper may remove the trousers and/or undergarment completely e.g. before a shower or in relation to changing clothes.

When the trousers and/or undergarment needs to come back up around the waist of the person in the chair 1, the process is more or less reversed in that first the rear part 8 and the bottom part 4 (or only the rear part 8 and then the bottom part 4) is raised so that the trousers and/or undergarment may be pulled up to the rear part 8 after which the rear part 8 is lowered and the trousers and/or undergarment are pulled up to the bottom part 4. The rear part 8 is then lifted again and the bottom part 4 is lowered so that the trousers and/or undergarment may be pulled all the way back up around the waist of the person before the bottom part 4 is lowered and the leg rest 10 and back 2 is e.g. returned to the position disclosed in FIG. 1 and/or the person is lifted back into bed.

In this embodiment, the displacing of the rear part 8 is enabled through seat mechanical actuation means 17 which in this case comprises rear part actuator 19 and linear guiding means 13 arranged to guide the rear part 8 linearly up and down in relation to the front part 6. However, in another embodiment the seat mechanical actuation means 17 could be formed to displace in a tilting manner and/or be enabled differently e.g. through a motor, through manually operated displacing means or otherwise.

In this embodiment, the rear part 8 is arranged to extend 8 centimetres up from the seat 5 when in upper position, but in another embodiment the stroke of the rear part could be 6, 4 or even fewer centimetres or the stroke could be 10, 12 or even more. Or the stroke could be adjustable.

FIG. 5 illustrates a toilet chair 1 with a bottom part 4 raised, as seen from the side.

In this embodiment, the bottom part 4 is arranged to be displaceable outwards in a direction towards the front of the chair 1 independently of the head part 3 so that the lumbar area of a person sitting in the chair may be lifted so that at least some of the buttocks area of the person is lifted free of the seat 5.

In this embodiment, the displacing of the bottom part 4 is enabled through back mechanical actuation means 16 which in this case comprises a back tilt joint 12—around which the bottom part 4 is arranged to tilt in relation to the head part 3—and a bottom part actuator 18. However, in another embodiment the back mechanical actuation means 16 could be formed to displace linearly and/or be enabled differently e.g. through a motor, through manually operated displacing means or otherwise.

In this embodiment, all actuators on the chair are electrically powered and the chair would therefore also be provided with an electrical power source such as a battery. However, in another embodiment the motion of the chair and chair parts could be driven differently, e.g. through pneumatics, hydraulics, motors or other.

In this embodiment, the bottom edge of the bottom part 4 is arranged to be raised around 8 centimetres in upper position, but in another embodiment the stroke of the bottom part 4 could be 6, 4 or even fewer centimetres or the stroke could be 10, 12 or even more. Or the stroke could be adjustable.

FIG. 6 and FIG. 7 illustrate a toilet chair 1 in raised position as seen in perspective and from the side.

In this embodiment, the chair 1 is also provided with a seat 5 which in this case is formed as a single part having a front part 6 and a rear part 8.

FIG. 8 and FIG. 9 illustrate a toilet chair 1 in lowered position as seen in perspective and from the side.

In this embodiment, the toilet chair 1 comprises back angle adjustment means 9 for adjusting the back angle BA of the back 2 in relation to the seat 5 so that the back 2 may be adjusted from a more or less upright position as disclosed in FIG. 6 to a leaned back position as disclosed in FIG. 8.

In this embodiment the back angle BA and leg rest angle LA are mechanically coupled by means of angle link 22 so that if e.g. the back 2 is moved backwards the leg rest 10 is automatically simultaneously raised, but in another embodiment the back angle BA and leg rest angle LA can be individually adjusted.

Also, in this embodiment the back angle BA and leg rest angle LA could also or instead be mechanically coupled with the seat angle SA so that if e.g. the back 2 is moved backwards the leg rest 10 and the seat 5 is automatically simultaneously raised—although not at the same ratio.

In this embodiment, the back angle BA and leg rest angle LA are coupled by angle link 22 and adjusted by means of the same actuator 9 but in another embodiment one or more of the back angle BA, leg rest angle LA and the seat angle SA could also or instead be manually operated.

FIG. 10 and FIG. 11 illustrate a toilet chair 1 with a tilted seat 5, as seen in perspective and from the side.

In this embodiment, the seat 5 is arranged to be rotated around a seat pivot point 20 which in this embodiment is located at the seat tilt joint 21 to a tilted position so that the upper part of the buttocks—the part neighbouring the lumbar area—of a person occupying the chair 1 is lifted. When the seat 5 is formed as a single part this design entails that when the rear part 8 is fully raised (as illustrated in FIG. 11) the front part 6 of the seat 5 is also raised a little.

In this way the lumbar area of this person is also lifted and a helper may pull the trousers and/or undergarment of this dressed person down and towards the leg rest 10. After this, the seat 5 is rotated back to its original position and bottom part 4 is rotated to a raised position as disclosed in FIG. 13 so that the buttocks area of the person is lifted in relation to the seat 5 so that the trousers and/or undergarment may be pulled further down towards the knees of the person. After the trousers and/or undergarment are pulled towards the knees, the bottom part 4 could be rotated back to original position and the seat 5 could be raised again to enable that the trousers and/or undergarment may be pulled further down. With trousers and/or undergarment in this pulled down position the person may go to the toilet through the toilet opening 7 or the helper may remove the trousers and/or undergarment completely e.g. before a shower or in relation to changing clothes.

In this embodiment, the bottom part 4 and rear part 8 of the seat 5 are mechanically coupled by the displacement link 24. The displacement link 24 is constructed using suitable mechanical links and joints such that the geometry of the displacement link 24 enables rising of either the seat 5 or the bottom part 4, but not simultaneously, by use of the seat mechanical actuation means 17. Furthermore, the displacement link 24 includes a neutral position wherein the bottom part 4 and seat 5 are both in their original positions.

However, in another embodiment, the seat 5 and bottom part 4 may be tilted individually and simultaneously by means of individual actuators (not shown).

In this embodiment, the seat pivot point 20 is located at the seat tilt joint 21 between the leg rest and the seat, but in another embodiment the seat pivot point 20 may be located at any point in space whereby it is understood that the seat pivot point 20 may be located at a point outside of the physical scope of the chair 1 and wherein the seat pivot point 20 is obtained by rotation using e.g. a suitable mechanical linkage. Furthermore, in this embodiment, the seat 5 comprises a single part, but in another embodiment the seat may comprise two or more parts, wherein the part furthest to the bottom part is rotated around the seat pivot point 20.

When the trousers and/or undergarment needs to come back up around the waist of the person in the chair 1, the process is more or less reversed in that first the seat 5 and the bottom part 4 (or only the seat 5 and then the bottom part 4) are rotatably raised so that the trousers and/or undergarment may be pulled up after which the seat 5 is lowered and the trousers and/or undergarment are pulled up to the bottom part 4. The seat 5 is then tilted again and the bottom part 4 is lowered so that the trousers and/or undergarment may be pulled all the way back up around the waist of the person before the bottom part 4 is lowered and the leg rest 10 and back 2 is e.g. returned to the position disclosed in FIG. 6 and/or the person is lifted back into bed.

In this embodiment, the tilting of the rear part 8—or in this case the entire seat 5—is enabled through seat mechanical actuation means 17 and displacement link 24 and seat tilt joint 21 arranged to tilt the seat 5 or the rear part 8. However, in another embodiment the seat mechanical actuation means 17 and displacement link 24 could be formed to displace the seat 5 or the rear part 8 linearly and/or be enabled differently e.g. through a motor, through manually operated displacing means or otherwise.

FIG. 12 and FIG. 13 illustrate a toilet chair 1 with a raised bottom part 4 as seen in perspective and from the side.

In this embodiment, the tilting of the bottom part 4 is enabled through back mechanical actuation means 16 and displacement link 24 and a back tilt joint 12 around which the bottom part 4 is arranged to rotate to a tilted position in relation to the head part 3. However, in another embodiment the back mechanical actuation means 16 could be formed to displace the bottom part linearly and/or be enabled differently e.g. through a motor, through manually operated displacing means or otherwise.

In this embodiment, the back pivot point 23 is located at the back tilt joint 12, but in another embodiment the back pivot point 23 may be located at any point in space whereby it is understood that the back pivot point may be located at a point outside of the physical scope of the chair and wherein the back pivot point location is obtained by rotation the bottom part using e.g. a suitable mechanical linkage. Furthermore, the bottom part may comprise two or more parts, wherein the part furthest to the bottom is rotated around the back pivot point 23 to a tilted position.

The invention has been exemplified above with reference to specific examples of chair designs, back angle adjustment means 9, back tilt joints 12 and other. However, it should be understood that the invention is not limited to the particular examples described above but may be designed and altered in a multitude of varieties within the scope of the invention as specified in the claims.

LIST

1. Toilet chair
2. Chair back
3. Head part
4. Bottom part
5. Seat
6. Front part
7. Toilet opening
8. Rear part
9. Back angle adjustment means
10. Leg rest
11. Leg rest angle adjustment means
12. Back tilt joint
13. Linear guiding means
14. Underframe
15. Wheel
16. Back mechanical actuation means
17. Seat mechanical actuation means
18. Bottom part actuator
19. Rear part actuator
20. Seat pivot point
21. Seat tilt joint
22. Angle link
23. Back pivot point
24. Displacement link
BA. Back angle
LA. Leg rest angle
SA. Seat angle

The invention claimed is:

1. A toilet chair comprising:
a chair back including:
a head part, and
a bottom part; and
a seat including:
a front part,
a rear part, and
a toilet opening through which a user uses a toilet,
wherein the bottom part and the rear part are arranged next to each other,
wherein the bottom part is displaceable outwards in a direction towards the front part,
wherein the rear part is displaceable upwards in a direction towards the front part, and
wherein the rear part is displaceable upwards via a linear guide for guiding the rear part linearly upwards.

2. The toilet chair according to claim 1, wherein the toilet chair includes a back angle adjuster for adjusting a back angle of the chair back in relation to the seat.

3. The toilet chair according to claim 2, wherein the toilet chair includes:
a leg rest; and
a leg rest angle adjuster for adjusting a leg rest angle of the leg rest in relation to the seat.

4. The toilet chair according to claim 3, wherein the toilet chair includes an angle link to link the back angle to the leg rest angle.

5. The toilet chair according to claim 1, wherein the toilet chair includes:
a back mechanical actuator for displacing the bottom part; and
a seat mechanical actuator for displacing the rear part.

6. The toilet chair according to claim 5, wherein the back mechanical actuator and the seat mechanical actuator are linked via a displacement link.

7. The toilet chair according to claim 1, wherein the bottom part is displaceable outwards by being arranged to tilt around a back pivot point.

8. The toilet chair according to claim 1, wherein the rear part is displaceable upwards by being arranged to tilt around a seat pivot point.

9. The toilet chair according to claim 1, wherein the head part and the bottom part are formed as two separate individual parts.

10. The toilet chair according to claim 9, wherein the bottom part is displaceable outwards via a back tilt joint arranged at a transition between the head part and the bottom part to enable the bottom part to tilt around the back tilt joint.

11. The toilet chair according to claim 1, wherein the front part and the rear part are formed as two separate individual parts.

12. The toilet chair according to claim 11, wherein the rear part is displaceable upwards by means of a seat tilt joint arranged at a transition between the front part and the rear part to enable the rear part to tilt around the seat tilt joint.

13. The toilet chair according to claim 1, wherein the bottom part is displaceable outwards independently of the head part.

14. The toilet chair according to claim 1, wherein the rear part is displaceable upwards independently of the front part.

15. The toilet chair according to claim 1, wherein the toilet opening extends across the front part and the rear part.

16. A method for aiding a person in getting undressed by means of a toilet chair, the toilet chair including a chair back having a head part and a bottom part, a seat having a front part, a rear part, and a toilet opening through which the person may go to the toilet, wherein said bottom part and said rear part are arranged next to each other, wherein said bottom part is arranged to be displaceable outwards in a direction towards the front part, wherein said rear part is arranged to be displaceable upwards in a direction towards the front part, and wherein said method comprises the steps of:

placing said person in said toilet chair,
displacing said rear part upwards,
pulling trousers and/or undergarment of said person down towards said rear part,
displacing said bottom part outward,
retracting said rear part,
pulling said trousers and/or undergarment of said person down towards said front part,
displacing said rear part upwards again to pull said trousers and/or undergarment of said person further down towards said front part after which said rear part is retracted again, and
retracting said bottom part.

17. The method according to claim 16, wherein said chair back is tilted backwards before said rear part is displaced upwards.

18. The method according to claim 16, wherein said toilet chair comprises includes a leg rest, and
wherein said leg rest is tilted upwards before said rear part is displaced upwards.

19. The method according to claim 16, wherein said rear part is displaced upwards while said bottom part is retracting and vice versa.

20. A method for aiding a person in getting dressed by means of a toilet chair, the toilet chair including a chair back having a head part and a bottom part, a seat having a front part, a rear part, and a toilet opening through which the person may go to the toilet, wherein said bottom part and said rear part are arranged next to each other, wherein said bottom part is arranged to be displaceable outwards in a direction towards the front part, wherein said rear part is arranged to be displaceable upwards in a direction towards the front part, and wherein said method comprises the steps of:

placing said person in said toilet chair,
displacing said rear part upwards,
pulling trousers and/or undergarment of said person up towards said rear part,
displacing said bottom part outward,
retracting said rear part,
pulling said trousers and/or undergarment of said person up towards said front part,
displacing said rear part upwards again,
retracting said bottom part to pull said trousers and/or undergarment of said person further up towards said head part, and
retracting said rear part after which said person may be removed from said toilet chair.

21. The method according to claim 20, wherein said chair back is tilted backwards before said rear part is displaced upwards.

22. The method according to claim 20, wherein said toilet chair includes a leg rest, and
wherein said leg rest is tilted upwards before said rear part is displaced upwards.

23. The method according to claim 20, wherein said rear part is displaced upwards while said bottom part is retracting and vice versa.

* * * * *